No. 808,008. PATENTED DEC. 19, 1905.
J. Z. CAGLE.
HOSE COUPLING.
APPLICATION FILED JULY 12, 1905.
Fig. 1.
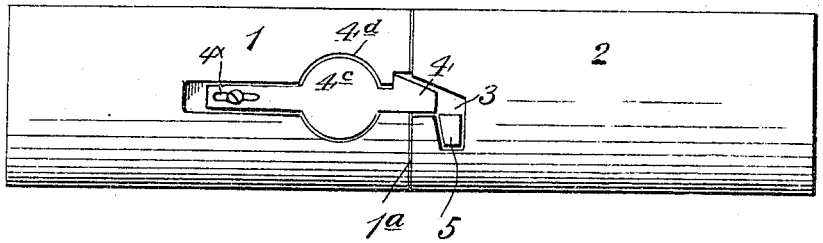
Fig. 2.
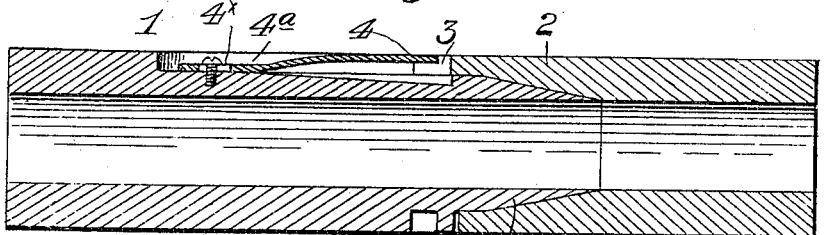
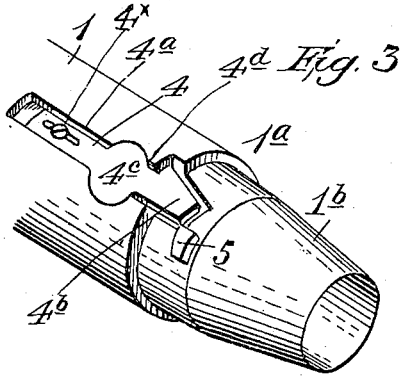
Fig. 3.
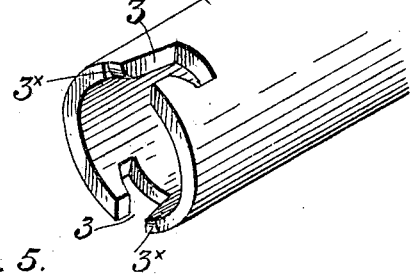
Fig. 4.
Fig. 5.
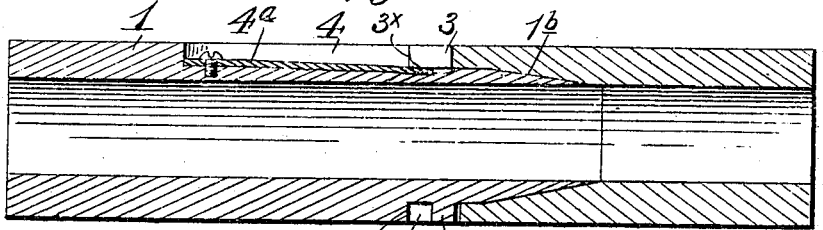
Witnesses:
F. L. Ourand.
J. H. Pfister.
Inventor.
John Z. Cagle,
By Lewis Bagger & Co.
Attorneys

UNITED STATES PATENT OFFICE.

JOHN Z. CAGLE, OF UPWARD, NORTH CAROLINA.

HOSE-COUPLING.

No. 808,008.  Specification of Letters Patent.  Patented Dec. 19, 1905.

Application filed July 12, 1905. Serial No. 269,377.

*To all whom it may concern:*

Be it known that I, JOHN Z. CAGLE, a citizen of the United States, residing at Upward, in the county of Henderson and State of North Carolina, have invented new and useful Improvements in Hose-Couplings, of which the following is a specification.

My invention relates to improvements in pipe or hose couplings.

Objects of the invention are to provide for the ready coupling and uncoupling of the pipe or hose sections and the effective retention of said sections when so coupled or connected and to carry out these ends in a simple, inexpensive, and expeditious manner.

It consists of certain structural features, substantially as hereinafter fully disclosed and particularly specified.

In the accompanying drawings, illustrating the preferred embodiment of my invention, Figure 1 is a side view showing the application of said invention to the nozzles of the adjacent ends of two pipe or hose members or sections. Fig. 2 is a broken axial or longitudinal section thereof. Figs. 3 and 4 are disassembled views of said parts, respectively. Fig. 5 is a transverse section produced through the L-shaped or bayonet form of slots of one nozzle of a pipe or hose member or section.

In the disclosure of my invention I provide the nozzles 1 and 2 of the pipe or hose sections or members with the ordinary L-shaped or bayonet form of slots or notches 3 and a spring-metal latch or dog 4, respectively. Said slots have their entrances opening out through the inner end of said nozzle 1, and said nozzle upon its inner edge immediately adjacent to the initial wall or edge of each slot 3 is slightly beveled, as at $3^\times$, for the ready passage of the point of the dog or latch 4 past said edge for initially depressing said latch as against the normal or upward exerting action of its spring when the nozzles of the hose sections or members are brought together for coupling. The latch 4 is provided with a longitudinal slot $4^\times$ where its securing screw or bolt passes therethrough to permit of maintaining its tension by the requisite movement of said latch, as occasion requires, from wear, &c., as will be readily appreciated.

The nozzle 1 has extending from an annular forwardly-facing shoulder $1^a$ thereof a reduction or extension $1^b$, having a preferably cylindric surface for a portion of its length and somewhat tapered the remainder thereof, with a suitable packing seated therein, the opposite nozzle 2 having a corresponding interior surface for the reception of said reduction $1^b$ and the forming of a tight joint therebetween. Upon the cylindric surface of the reduction or extension 1 are cast or formed opposed studs or projections 5, arranged a short distance from the shoulder $1^a$ for engagement with and insertion into the slots 3 of the opposite nozzle 2, the arms formed by said slots passing in between said studs and the shoulder $1^a$ of the nozzle 1 to aid the coupling or connecting action, as will be appreciated.

The spring-metal latch or dog 4 is countersunk or let into a corresponding depression or recess $4^a$, produced in the nozzle 1, of sufficient depth to permit said dog or latch to be so depressed that its forward end shall rest flush with the outer circumference or surface of the cylindric portion of the extension or reduction $1^b$ for initially removing said dog out of the way as the first-referred-to nozzle is inserted into the opposite nozzle 2. The latch or dog 4 has its outer end or point immediately contiguous to one of the studs 5 and its outer forward end or point adapted by engagement or contact with the beveled edge $3^\times$ of the opposite nozzle 2 to be inserted or pass under said edge. The effective edge of said dog or latch is tapered outward, as at $4^b$, whereby after the insertion of its forward end, as stated, within the nozzle 2 and by simultaneously and reversely turning the two nozzles said edge is permitted to readily spring upward past the outward-inclined corresponding or initial edge of the slot, thus receiving therein said forward end of said dog, when the dog will be locked in said slot, together with the studs 5. The dog or latch 4 has intermediate its ends a thumb or finger piece $4^c$, resting in lateral recess extensions $4^d$ of the recess or countersink containing the dog to provide for the ready depressing of the latter manually when it may be required to disconnect or uncouple the nozzles of the hose or pipe sections, as will be readily understood. The depressions or recesses $4^d$ are not so deep as that receiving the dog or latch itself, the finger or thumb piece $4^c$ standing somewhat above the plane of said dog, particularly of the lower surface thereof.

It is apparent that by suitably grasping the hose member nozzles with the thumb or finger pressed upon the dog or latch 4 at $4^c$, disengaging the latter from the initial edge or wall of the opposite nozzle, and turning said nozzles oppositely from the direction in which they were turned in effecting the coupling together thereof the studs 5 will be moved laterally out of the locking portions or arms of the notches or slots 3, and as said nozzles are continued to be manipulated said studs will be wholly withdrawn from said slots and said dog or latch from within the engaged nozzle, thus permitting the separating of the hose sections or members.

I claim—

1. A coupling of the character described, comprising the nozzle members, one equipped with a depressible spring dog or latch having a tapered forward end, and the other nozzle having a slot or notch opening out through its inner edge, said edge being slightly beveled adjacent to the initial or nearer edge of said slot or notch, and said dog or latch effective to engage said inner beveled edge and, after passing the same, to spring into said notch for the engagement of its tapered forward edge with the corresponding or initial edge of said notch or slot.

2. A coupling of the character described, comprising the nozzle members, one having an annular forwardly-facing shoulder and a reduction or extension forward of said shoulder, said nozzle member being equipped with a depressible spring latch or dog and a stud arranged upon said extension, the other nozzle member having a notch or recess of the outline described, and its inner edge, immediately adjacent to said stud, provided with a slightly-beveled surface for engagement with the forward end or point of said latch or dog, said notch or recess being adapted to receive said stud.

3. A coupling of the character described, comprising nozzle members, one having an annular forwardly-facing shoulder and forward of said shoulder a reduction or extension telescoping the opposed nozzle member, said nozzle member also being equipped with a depressible spring latch or dog and with studs adjacent to the forward end of said dog or latch, said latch or dog being countersunk in said nozzle member, and the other nozzle member having "bayonet-form" slots or notches effective to receive said studs and dog or latch also engaging one of said notched or slotted nozzles also having its forward edge provided with slightly-beveled surfaces adjacent to the initial walls or edges of said notches or slots, said initial walls being inclined outward and said dog or latch having an oppositely-tapered forward end effective for lateral engagement with said initial walls.

In testimony whereof I affix my signature in presence of two subscribing witnesses.

JOHN Z. CAGLE.

Witnesses:
T. C. ISRAEL,
J. H. TINLEY.